(12) United States Patent
Bellah et al.

(10) Patent No.: US 11,733,000 B2
(45) Date of Patent: Aug. 22, 2023

(54) RIFLESCOPE WITH TURRET ENCODER CONTROLLED LASER RANGEFINDER

(71) Applicant: Lightforce USA, Inc., Orofino, ID (US)

(72) Inventors: Brian J. Bellah, Orofino, ID (US); Chad VanBrunt, Orofino, ID (US); Kali Gagne Morici, Orofino, ID (US); Kyle Klosterman, Lewiston, ID (US)

(73) Assignee: Lightforce USA, Inc., Orofino, ID (US)

( * ) Notice: Subject to any disclaimer, the term of this patent is extended or adjusted under 35 U.S.C. 154(b) by 232 days.

(21) Appl. No.: 17/405,618

(22) Filed: Aug. 18, 2021

(65) Prior Publication Data
US 2022/0065586 A1 Mar. 3, 2022

Related U.S. Application Data

(60) Provisional application No. 63/069,807, filed on Aug. 25, 2020.

(51) Int. Cl.
| | | |
|---|---|---|
| F41G 3/06 | (2006.01) | |
| F41G 1/473 | (2006.01) | |
| G02B 5/04 | (2006.01) | |

(52) U.S. Cl.
CPC ............. *F41G 3/065* (2013.01); *F41G 1/473* (2013.01); *G02B 5/045* (2013.01)

(58) Field of Classification Search
None
See application file for complete search history.

(56) References Cited

U.S. PATENT DOCUMENTS

| | | |
|---|---|---|
| 8,363,321 B1 | 1/2013 | Pochapsky |
| 9,164,269 B1 | 10/2015 | Jahromi |
| 10,379,135 B2 | 8/2019 | Maryfield et al. |
| 10,571,677 B2 | 2/2020 | Maryfield et al. |
| 2005/0039370 A1 | 2/2005 | Strong |
| 2012/0246992 A1 | 10/2012 | Peters et al. |

(Continued)

FOREIGN PATENT DOCUMENTS

WO 2019199735 A1 10/2019

OTHER PUBLICATIONS

Thorlabs, Application Note, Risley Prism Scanner, Revision 1, undated, 33 pages.

*Primary Examiner* — Luke D Ratcliffe
(74) *Attorney, Agent, or Firm* — Wood Herron & Evans LLP

(57) ABSTRACT

Provided is a weapon aiming system including a riflescope and a laser rangefinder (LRF). The riflescope has at least one turret for adjusting the position of an internal reticle aimpoint. At least one encoder senses a relative position change of the turret and/or reticle. The LRF includes at least one pair of Risley prisms operable to adjustably position a LRF aimpoint to coincide with the aimpoint of the riflescope reticle. A motor is associated with each Risley prism. The system is configured such that adjusting the aimpoint of the riflescope reticle causes the encoder to send a position change signal to a controller programmed to, in response, direct the motor to reposition the prisms so that the LRF aimpoint continues to coincide with the reticle aimpoint.

9 Claims, 3 Drawing Sheets

(56) References Cited

U.S. PATENT DOCUMENTS

| | | |
|---|---|---|
| 2015/0176948 A1* | 6/2015 | Varshneya ................ F41G 1/00 |
| | | 235/404 |
| 2015/0247702 A1 | 9/2015 | Davidson et al. |
| 2015/0345908 A1* | 12/2015 | Maryfield ................ F41G 1/36 |
| | | 356/152.1 |
| 2016/0267679 A1* | 9/2016 | Maryfield ............ G02B 23/105 |
| 2018/0224652 A1* | 8/2018 | Havens ................ G02B 27/283 |
| 2019/0113307 A1 | 4/2019 | Lv |
| 2019/0186871 A1* | 6/2019 | York ........................ F41G 1/38 |
| 2020/0026058 A1 | 1/2020 | Maryfield et al. |

* cited by examiner

RIFLESCOPE WITH TURRET ENCODER CONTROLLED LASER RANGEFINDER

RELATED APPLICATIONS

This application claims priority to U.S. Provisional Patent Application No. 63/069,807, filed Aug. 25, 2020, and incorporates the same herein by reference.

TECHNICAL FIELD

This invention relates to the combination of an optical weapon aiming device (riflescope) and a laser rangefinder (LRF). More particularly, it relates to a riflescope with one or more position-sensing encoders to cause corresponding re-adjustment of the aim of the LRF when the reticle position of the riflescope is changed.

BACKGROUND

In a laser rangefinder (LRF) using one or more sets of Risley prisms, a system that is controlled by electronic stepper motors can simultaneously steer two different wavelength laser beam sources and deliver them to a specified position at some distance on a target. When light travels through materials of different refractive indexes, in this case different types of glass, the rays will refract and disperse. Refraction is the bending of light at interfaces of different mediums, while dispersion is a property of materials that causes different wavelengths to refract at different angles. In a material with a normal dispersion curve, the refractive index increases as the wavelength decreases. For light traveling through a single prism, dispersion would cause visible light to bend more than near infrared light. The different amount of refraction between the two different wavelengths is problematic. The two sources are then oriented in such a way that the visible (VIS) wavelength passes through the one part of the four prisms while the near infrared (NIR) wavelength passes through all eight pieces of glass. Therefore, in order to correct for dispersion, the smaller prism is placed in the center and cemented to the first prism. The combination of glasses with different dispersive characteristics allow the VIS and NIR light to refract equally, causing the beams to travel parallel with one another when projected from the system. This structure is described in U.S. Pat. No. 10,571,677, titled Multi-Wavelength Risley Prisms for Laser Bore-Sighting, issued Feb. 25, 2020, and owned by Cubic Corporation of San Diego, Calif.

However, once the LRF is zeroed or adjusted to correspond with the aim of a weapon's riflescope, any resetting of the riflescope's zero to a different target distance will cause the LRF to no longer be co-aligned with the riflescope reticle. Adjustment of the scope's elevation and windage turrets changes the position of the internal reticle relative to the field of view in a well-known manner. This allows the "zero" (usually the intersection of the primary reticle lines) to be adjusted to correspond to different known target distances. If the aim of the VIS/NIR laser sources of a laser rangefinder (LRF) have been set or "zeroed" to one reticle distance setting, changing the elevation and/or windage adjustment of the internal reticle position by adjusting the scope's turrets will cause the LRF to no longer be aligned with the scope reticle.

SUMMARY OF THE INVENTION

The present invention provides a weapon aiming system including a riflescope and a laser rangefinder (LRF). The riflescope has at least one turret for adjusting the position of an internal reticle aimpoint. At least one encoder senses a relative position change of at least the turret and/or the reticle. A laser rangefinder (LRF) has with at least one pair of associated Risley lenses operable to adjustably position the LRF aimpoint to coincide with the aimpoint of the riflescope reticle. The system is configured such that adjusting the aimpoint of the riflescope reticle causes the encoder to send a position change signal to the controller programmed to, in response, direct a motor to reposition the prisms so that the LRF aimpoint continues to coincide with the reticle aimpoint.

According to the present invention, a so-equipped LRF, with stepper motors to control the Risley prism pairs(s), can be operably connected (via wired connection or a wireless communication, such as Bluetooth™ technology) with a riflescope having position encoder-equipped turrets. When a turret is manually adjusted by the scope operator, the new turret-location is sensed by the turret position encoders and communicated to the LRF in real time where electronic stepper motors, controlling the prisms' rotation, will counter-rotate the prism pairs to keep the VIS/NIR laser sources aimed to the specified location on the reticle of the scope. This keeps the VIS/NIR laser sources in a constant pre-defined position relative to the aim of the riflescope and are controlled by sensing adjustment of the turret position to retain a constant point-of-impact with the riflescope.

Other aspects, features, benefits, and advantages of the present invention will become apparent to a person of skill in the art from the detailed description of various embodiments with reference to the accompanying drawing figures, all of which comprise part of the disclosure.

BRIEF DESCRIPTION OF THE DRAWINGS

Like reference numerals are used to indicate like parts throughout the various drawing figures, wherein.

DETAILED DESCRIPTION

Figure 1:
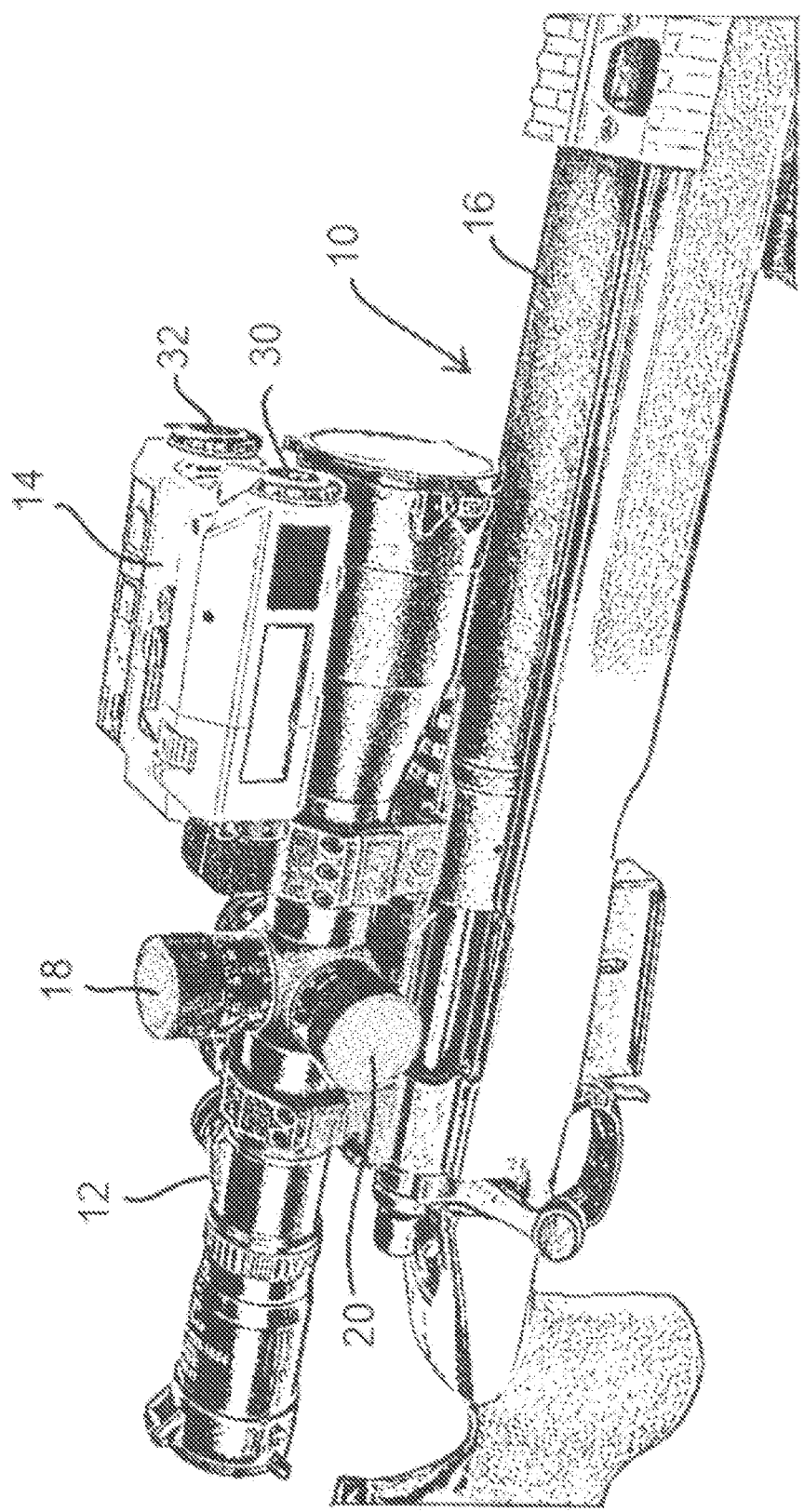
FIG. 1 is a fragmentary pictorial view of a riflescope and laser rangefinder mounted on a rifle according to one embodiment of the present invention.
Figure 2:
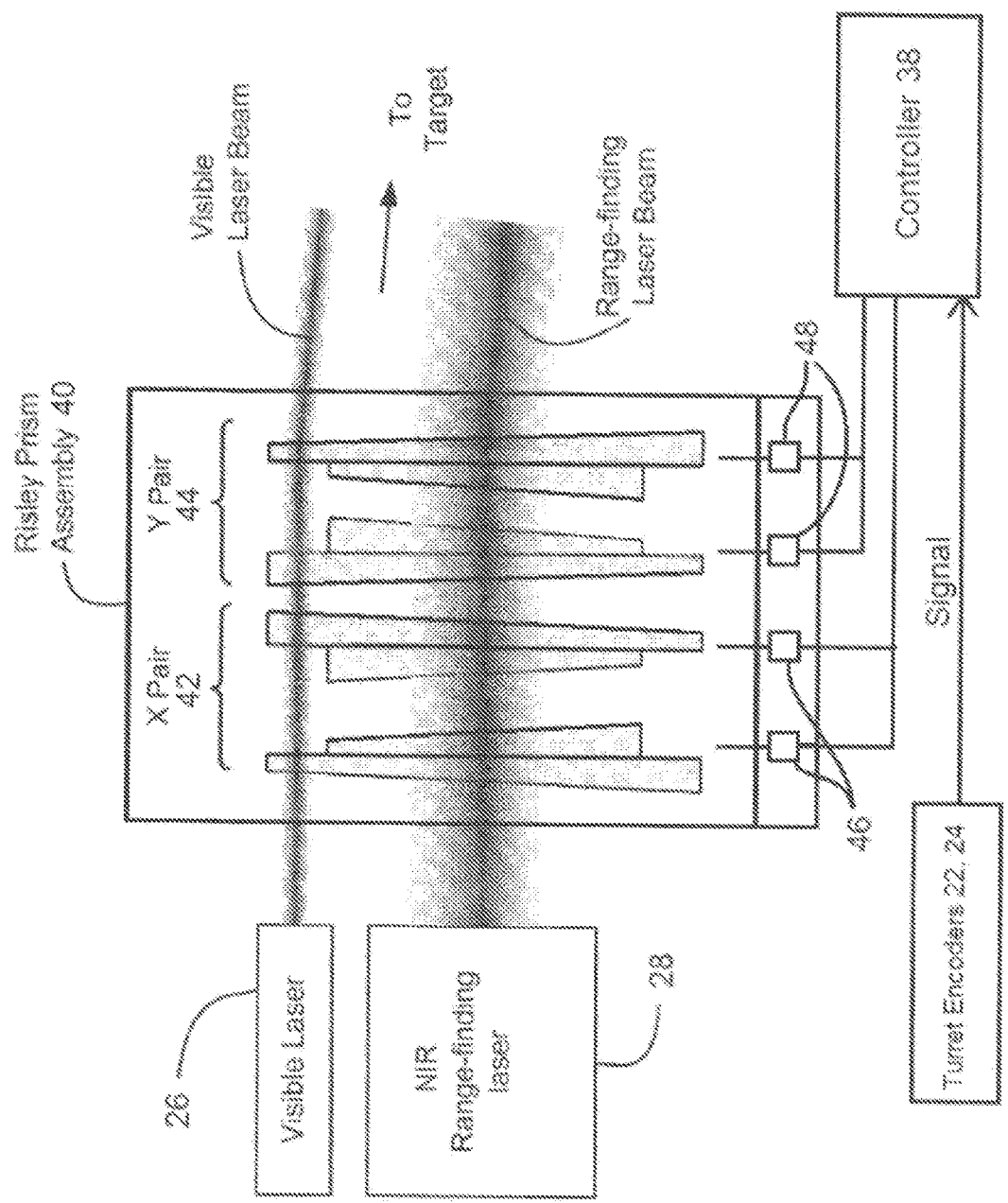
FIG. 2 is a schematic depiction of stepper motor-controlled Risley prism pairs in a laser rangefinder according to an embodiment of the invention.

With reference to the drawing figures, this section describes particular embodiments and their detailed construction and operation. Throughout the specification, reference to "one embodiment," "an embodiment," or "some embodiments" means that a particular described feature, structure, or characteristic may be included in at least one embodiment. Thus, appearances of the phrases "in one embodiment," "in an embodiment," or "in some embodiments" in various places throughout this specification are not necessarily all referring to the same embodiment. Furthermore, the described features, structures, and characteristics may be combined in any suitable manner in one or more embodiments. In view of the disclosure herein, those skilled in the art will recognize that the various embodiments can be practiced without one or more of the specific details or with other methods, components, materials, or the like. In some instances, well-known structures, materials, or operations are not shown or not described in detail to avoid obscuring aspects of the embodiments. "Forward" will indicate the direction of the muzzle and the direction in which projectiles are fired, while "rearward" will indicate the opposite direction. "Lateral" or "transverse" indicates a side-to-side direction generally perpendicular to the axis of the barrel. Although firearms may be used in any orientation, "left" and "right" will generally indicate the sides according to the user's orientation, "top" or "up" will be the upward direction when the firearm is gripped in the ordinary manner.

Referring first to FIG. 1, therein is shown projectile-firing weapon system (in this case, a bolt-action rifle 10) with an optical aiming device (rifle scope 12) and laser rangefinder (LRF) 14 mounted to the scope 12 or weapon 10. The scope 12 and the LRF 14 are mounted in aiming alignment with the rifle's barrel 16. A riflescope has objective and ocular lenses with an aiming reticle therebetween mounted in a tubular housing. Modern scopes have a reticle that is adjustable in vertical and lateral directions by external adjustment turrets 18, 20 according to a well-known operation. One turret 18 adjusts the reticle vertically (X axis) for elevation and the other turret 20 adjusts it laterally (Y axis) for windage. The turrets 18, 20 are used to adjust the reticle to correspond with the "zero" impact point of the rifle 10 at a given range. The turrets 18, 20 can then be used to further adjust the reticle to the aim point for a different target distance or to offset for the effect of wind.

According to one aspect of the invention, the scope 12 includes position-sensing encoders 22, 24 (not shown in FIG. 1) that track the relative rotational positions of the turrets 18, 20 and/or the relative X-Y positions of the internal reticle 25. The encoders 22, 24 output signals according to well-known constructions and functions to indicate these positions. The scope 12 can have other display or operational features and functions not illustrated or described herein that are not part of or essential to the invention.

Figure 3:
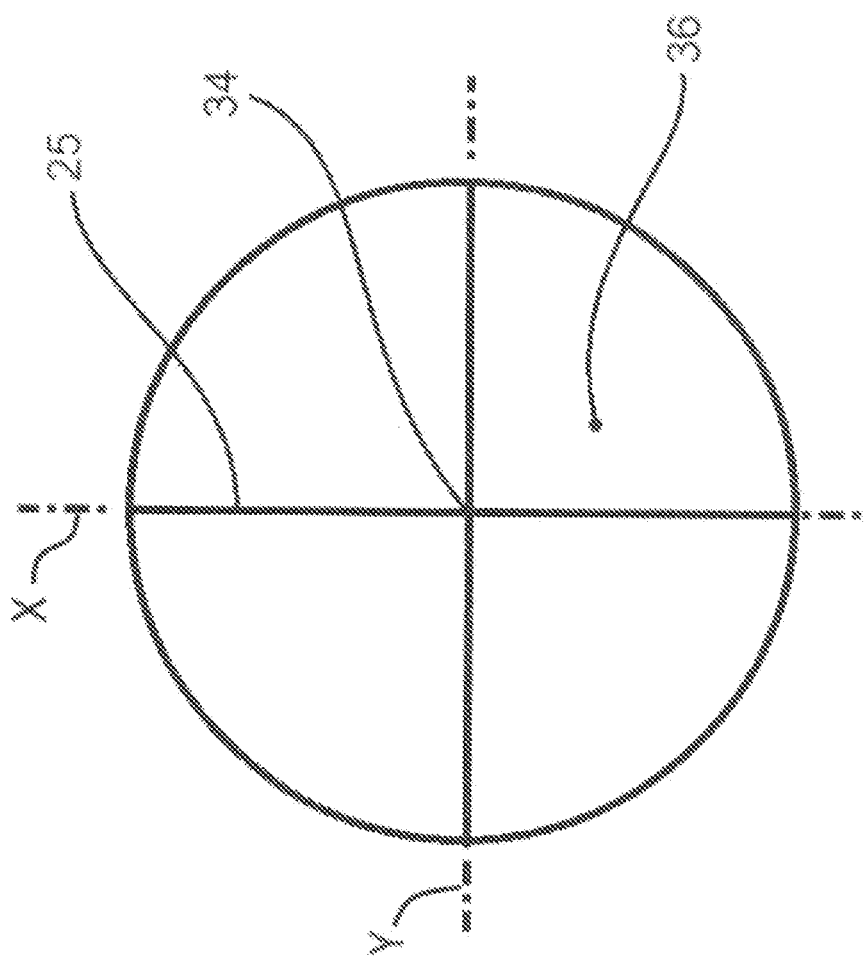
FIG. 3 is a view illustrating the aimpoint of a reticle and unadjusted aimpoint of a laser rangefinder.

According to another aspect of the invention, an LRF 14 is paired and co-aligned with the scope 12. The illustrated LRF 14 is mounted on the scope 12, but it can be mounted on the rifle 10 or even incorporated into the scope 12. In order to assure that the range being measured is to a specific target, a LRF 14 usually has a visible (VIS) laser light source 26 for visual aiming and a near infrared (NIR) laser light source 28 for distance measurement. NIR is considered a spectrum "nonvisible" to humans without an IR enhancement device (like a night vision device). These sources 26, 28 may share a common send optical aperture (SX) 30 and have a receiver photodiode and optical aperture (RX) 32 to detect the reflected NIR beam. The VIS beam is used to align the aim of the LRF 14 with the aimpoint 34 or other selected point of the reticle 25 of the scope 12. It is critical that the VIS and NIR beams stay co-aligned. In most LRFs, the common aimpoint of the beams is adjusted manually when installed to align with the aimpoint of the riflescope reticle at a predetermined target distance. Once adjusted, this setting is not readily changeable in the field. If the position of the reticle is adjusted in the field to compensate for wind or to zero to a different target distance (illustrated in FIG. 3), the shooter must remember and attempt to locate the prior, unadjusted aimpoint 34 of the LRF 14 to use the riflescope reticle 25 to aim the LRF 14 and measure another distance.

The present invention provides electronic encoders 22, 24 to detect the change in position of the turrets 18, 20 or reticle 25 and send a signal to a controller 38 that directs corresponding readjustment of the LRF aimpoint to stay coaligned with the aimpoint 34 of the riflescope reticle 25. Encoders 22, 24 are well-known and widely available that sense the rotational position of the turrets' 18, 20 adjustment dial or the linear position of the turret stem (not shown). Alternatively, one or more encoders 22, 24 can be configured to sense changes in the position of the reticle 25 (in either the first or second focal plane). Separate encoders 22, 24 may be used to sense the elevation (X-axis) and windage (Y-axis) positions of the turrets 18, 20 or reticle 25, Alternatively, a 2-dimensional encoder could be used to detect and signal the X-Y position of the reticle 25.

As described in U.S. Pat. No. 10,571,677, referenced above, the LRF 12 can include a Risley prism assembly 34 to adjust the two optical beams in unison. In this case, the assembly 40 uses two pairs 42, 44 of Risley prisms. Each prism in the pair 42, 44 is counter-rotated so that the pair refracts the beam(s) along one dimension. Using two prism pairs 42, 44 in tandem allows complete adjustment in two dimensions. According to another aspect of the invention, stepper motors 46, 48 may be associated with each of the prisms or prism pairs 42, 44 to precisely counter-rotate each prism pair 42, 44. With a gear mechanism (not shown), a single motor 46, 48 could be designed to counter-rotate a pair 42, 44 of prisms. Cost, weight, and relative mechanical complexity/reliability can determine the design choice, which is not critical to implementation of the present invention.

A controller 38 is configured to receive position signals from the encoder(s) 22, 24 and then operably control the stepper motor(s) 46, 48 to reposition the Risley prism pair(s) 42, 44 to adjust the aimpoint of the VIS and/or NIR beams to coincide with the adjusted aimpoint 34 position of the reticle 25. Thus, if the elevation turret 18, for example, is adjusted to reposition the reticle 25 from a target distance of 400 meters to a target distance of 450 meters, the encoder 22 senses the change in position and sends a quantified signal to the controller 38, which directs the stepper motor(s) 46 associated with the elevation (X-axis) pair 42 of Risley prisms to correspondingly reposition the aimpoint 36 of the LRF beam(s).

The controller 38 can be located in or on the scope 12, in or on the LRF 14, or in a separate device/housing (not shown). Communication between the encoders 22, 24, the controller 38, and the stepper motors 46, 48 can be wired or wireless, such as using Bluetooth™ protocol. The components 22, 24, 38, 46, 48 can be powered by separate power sources or by a common power source connected to one or more of the components 22, 24, 38, 46, 48. The LRF 14 can be weapon-mounted separately from the riflescope 12, on the riflescope 12 (shown in FIG. 1), or integrated with the riflescope into a unitary device. If desired, position and/or positioning signals can be sent (via wire or wireless) from the encoders 22, 24 and/or controller 38 to a LRF or target illuminator that is associated with a separate spotting scope (not shown).

While one or more embodiments of the present invention have been described in detail, it should be apparent that modifications and variations thereto are possible, all of which fall within the true spirit and scope of the invention. Therefore, the foregoing is intended only to be illustrative of the principles of the invention. Further, since numerous modifications and changes will readily occur to those skilled in the art, it is not intended to limit the invention to the exact construction and operation shown and described. Accordingly, all suitable modifications and equivalents may be included and considered to fall within the scope of the invention, defined by the following claim or claims.

What is claimed is:

1. A weapon aiming system, comprising:
a riflescope having at least one turret for adjusting the position of an internal reticle aimpoint;
at least one encoder that senses a relative position change of at least one of the turret and the reticle;
a laser rangefinder (LRF) associated with at least one pair of Risley prisms operable to adjustably position a LRF aimpoint to coincide with the aimpoint of the riflescope reticle;
a controller;
a motor associated with each Risley prism and controlled by the controller to position the associated prisms;
wherein the system is configured such that adjusting the aimpoint of the riflescope reticle causes the encoder to send a position change signal to the controller programmed to, in response, direct the motors to reposition the prisms so that the LRF aimpoint continues to coincide with the reticle aimpoint.

2. The system of claim 1, further comprising a power source.

3. The system of claim 2, wherein the power source is located in the LRF.

4. The system of claim 2, wherein the power source is located in the riflescope.

5. The system of claim 2, wherein separate power sources are located in the LRF and riflescope.

6. The system of claim 1, wherein the controller is located in the riflescope.

7. The system of claim 1, wherein the controller is located in the LRF.

8. The system of claim 1, wherein the riflescope include two turrets and two pairs of Risley prisms, one turret for elevation adjustment and one turret for windage adjustment, an encoder associated with each turret, two pairs of Risley prisms, of pair for elevation adjustment and one pair for windage adjustment, and stepper motors for each pair of Risley prisms.

9. The system of claim 1, wherein the LRF includes both visible and nonvisible laser sources.

* * * * *

UNITED STATES PATENT AND TRADEMARK OFFICE
CERTIFICATE OF CORRECTION

| | |
|---|---|
| PATENT NO. | : 11,733,000 B2 |
| APPLICATION NO. | : 17/405618 |
| DATED | : August 22, 2023 |
| INVENTOR(S) | : Brian J. Bellah et al. |

It is certified that error appears in the above-identified patent and that said Letters Patent is hereby corrected as shown below:

In the Specification

Column 1, Line 41, change "allow" to --allows--.

Column 2, Line 4, change "has with at" to --has at--.

Column 2, Line 25, change "and are" to --and they are--.

In the Claims

Claim 8, Column 6, Line 11, change "include" to --includes--.

Claim 8, Column 6, Line 15, change "of pair" to --one pair--.

Signed and Sealed this
Third Day of October, 2023

*Katherine Kelly Vidal*

Katherine Kelly Vidal
*Director of the United States Patent and Trademark Office*